(No Model.)

A. E. L. SLAZENGER.
PAD FOR CONVENIENCE IN HANDLING AND PICKING UP COINS.

No. 399,940. Patented Mar. 19, 1889.

Witnesses.
Robt. Everitt
Vinton Coombe

Inventor.
Albert E. L. Slazenger.
By
James L. Norris
Atty.

N. PETERS, Photo-Lithographer, Washington, D. C.

UNITED STATES PATENT OFFICE.

ALBERT E. L. SLAZENGER, OF LONDON, ENGLAND.

PAD FOR CONVENIENCE IN HANDLING AND PICKING UP COINS.

SPECIFICATION forming part of Letters Patent No. 399,940, dated March 19, 1889.

Application filed November 16, 1888. Serial No. 291,033. (No model.) Patented in England September 12, 1888, No. 13,222.

*To all whom it may concern:*

Be it known that I, ALBERT EGERTON LEGH SLAZENGER, a subject of the Queen of Great Britain, residing at 56 Cannon Street, in the city of London, England, merchant, have invented a certain new and useful Improved Pad for Convenience in Handling and Taking up Coins, (for which I have obtained a patent in Great Britain, No. 13,222, bearing date September 12, 1888,) of which the following is a specification.

This invention relates to elastic or rubber pads employed on counters and show-cases to facilitate picking up coins, and has for its object to provide a novel, efficient, and satisfactory device for this purpose that is void of the ordinary separated teats or nipples, which are objectionable in that they are frequently pulled off or torn by customers in curiously examining the mats or by handling the article by the teats or nipples, while if the latter be interiorly braced by wire or otherwise to prevent their tearing the cost of manufacture is so increased as to render the article expensive, and hence it is not in general use in small stores and similar places.

The object of my invention I accomplish by a pad composed of a flat base or foundation of close texture—such as soft rubber—
formed integral with numerous fibers rising upwardly and joined together to constitute a continuous cellular layer of spongy or spongiform rubber, which is in a measure porous to absorb moisture deposited thereupon, and can be squeezed out similar to an ordinary sponge.

The invention is illustrated by the accompanying drawings, in which—

Figure 1:
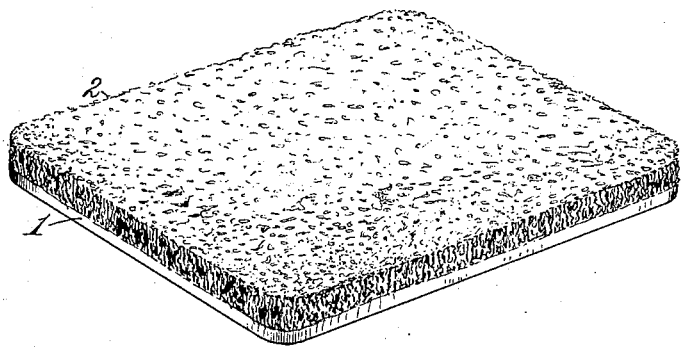
Figure 2:

Figure 1 is a perspective view of the coin-pad, and Fig. 2 a sectional view of the same.

In order to enable those skilled in the art to make and use my invention, I will now describe the same in detail, referring to the drawings, where the numeral 1 indicates a flat base or foundation piece of any desired shape in outline, and preferably composed of a sheet of soft rubber of close texture, which, as shown, is formed integral with numerous rubber fibers rising upwardly, all joined or connected together and constituting a continuous cellular top layer, 2, of spongy or spongiform rubber. This layer can be easily depressed by the tips of the fingers to facilitate picking up coins, and owing to its peculiar fibrous and cellular nature it will in a measure absorb any moisture that may be deposited thereupon, while it can be squeezed out similar to an ordinary sponge, thereby rendering it very desirable and useful for the marble and other counters of soda-fountains and other places where there is considerable moisture. The foundation or base composed of a soft-rubber sheet is made integral with the fibrous and cellular layer of spongy rubber by any of the usual methods practiced to unite parts of soft rubber.

By my invention I avoid the presence of the ordinary numerous rubber teats or nipples on a rubber sheet, which are objectionable, in that they are liable to be pulled or broken off by handling the mat.

Having thus described my invention, what I claim is—

As an improved article of manufacture, the herein-described coin-mat for show-cases and counters, consisting of a base or foundation piece provided with numerous connected rubber fibers rising therefrom and constituting a continuous cellular absorbent top layer of spongy rubber, substantially as described.

A. E. L. SLAZENGER.

Witnesses:
   GEO. DOWNING,
    5 *Quality Court, London, W. C.*
   JNO. DEAN,
    17 *Gracechurch Street, London, E. C.*